United States Patent [19]

Baird et al.

[11] Patent Number: 5,269,907

[45] Date of Patent: * Dec. 14, 1993

[54] PROCESS FOR REFORMING AT LOW SEVERITIES WITH HIGH-ACTIVITY, HIGH-YIELD, TIN MODIFIED PLATINUM-IRIDIUM CATALYSTS

[75] Inventors: William C. Baird, Baton Rouge, La.; Joseph P. Boyle, Sarnia, Canada; George A. Swan, III, Baton Rouge, La.

[73] Assignee: Exxon Research and Engineering Co., Florham Park, N.J.

[*] Notice: The portion of the term of this patent subsequent to Apr. 21, 2009 has been disclaimed.

[21] Appl. No.: 847,541

[22] Filed: Mar. 6, 1992

Related U.S. Application Data

[63] Continuation-in-part of Ser. No. 627,527, Dec. 14, 1990, abandoned.

[51] Int. Cl.$^5$ ............................................. C10G 35/085
[52] U.S. Cl. ........................................ 208/65; 208/63; 208/138; 208/139
[58] Field of Search .................... 208/65, 138, 139, 63

[56] References Cited

U.S. PATENT DOCUMENTS

| | | | |
|---|---|---|---|
| 3,647,679 | 3/1972 | Kirk, Jr. et al. | 208/63 |
| 3,718,578 | 2/1973 | Buss et al. | 208/139 |
| 4,125,454 | 11/1978 | Clem et al. | 208/65 |
| 4,588,495 | 5/1986 | Franck et al. | 208/64 |
| 4,613,423 | 9/1986 | Swann et al. | 208/65 |
| 4,677,094 | 6/1987 | Moser et al. | 208/139 |
| 4,714,538 | 12/1987 | Moser et al. | 208/139 |
| 4,714,539 | 12/1987 | Moser et al. | 208/139 |
| 4,714,540 | 12/1987 | Moser et al. | 208/139 |
| 4,737,262 | 4/1988 | Franck et al. | 208/65 |
| 4,737,483 | 4/1988 | Moser et al. | 208/139 |
| 4,963,249 | 10/1990 | Baird, Jr. et al. | 208/138 |

*Primary Examiner*—Helane Myers
*Attorney, Agent, or Firm*—Henry E. Naylor

[57] ABSTRACT

A process for reforming a naphtha feed at low severities with tin modified platinum-iridium catalysts. In particular, both high selectivity, and high activity are manifested by such catalysts in reforming a naphtha feed at low severities in the lead reactor, or reactors, of a series of reactors; i.e., within the dehydrogenation and ring isomerization zone, or zones, of a reforming unit. The lead reactors of the series are charged with a tin-containing platinum-iridium catalyst, and the naphtha feed reformed to produce a low RON clear $C_5+$ liquid reformate. The low octane product of the lead reactors may be transferred to a mogas pool, into blending components, or all or some part of the product further reformed. Preferably, the product is further reformed in a tail reactor, and preferably the tail reactor is charged with a non-tin containing platinum, or platinum-iridium catalyst.

12 Claims, No Drawings

PROCESS FOR REFORMING AT LOW SEVERITIES WITH HIGH-ACTIVITY, HIGH-YIELD, TIN MODIFIED PLATINUM-IRIDIUM CATALYSTS

CROSS REFERENCE TO RELATED APPLICATIONS

This is a coninuation-in-part of U.S. Ser. No. 07/627,527 now abandoned.

FIELD OF THE INVENTION

This invention relates to a process for reforming with high activity tin modified platinum-iridium catalysts. In particular, it relates to a low severity reforming process wherein these catalysts are employed in the lead reactor, or reactors, of a series for the production from naphtha of gasoline of relatively low octane.

BACKGROUND OF THE INVENTION

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, composited with a porous, inorganic oxide support, notably alumina. Platinum metal catalysts, or a catalyst which contains platinum to which one or more additional metal promoters have been added to form polymetallic catalysts, are conventionally employed in conducting reforming operations. For example, U.S. Pat. No. 3,718,578 (Buss et al.) discloses reforming with a catalyst comprising Pt, Ir and Sn. The catalyst of the instant invention also comprises these metals, although the method of preparation differs. The critical differences between U.S. Pat. No. 3,718,578 (Buss et al.) and the instant application are illustrated in examples found in the description of the invention. Buss et al. does not illustrate the uniform distribution of all three metals throughout an inorganic support, as does the instant invention.

In a reforming operation, one or a series of reactors constitute the reforming unit which provides a series of reaction zones. Typically, a series of reactors are employed, e.g., three or four reactors, these constituting the heart of the reforming unit. Each reforming reactor is generally provided with a fixed bed, or beds, of the catalyst, each receives down-flow feed, and each is provided with a preheater or interstage heater, because the reactions which take place are endothermic. A naphtha feed, with hydrogen, is concurrently passed through a preheat furnace and reactor, and then in sequence through subsequent interstage heaters and reactors of the series. The product from the last reactor is separated into a $C_5+$ liquid fraction which is recovered, and a vaporous effluent. The vaporous effluent is a gas rich in hydrogen, and usually contains small amounts of normally gaseous hydrocarbons, from which hydrogen is separated and recycled to the process.

Reforming is defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst. The recycled hydrogen suppresses, but cannot prevent the build up of coke.

The sum-total of the reforming reactions in most commercial operations occurs as a continuum between the first and last reaction zone of the series, i.e., as the feed enters and passes over the first fixed catalyst bed of the first reactor and exits from the last fixed catalyst bed of the last reactor of the series. During an on-oil run, the activity of the catalyst gradually declines due to the build-up of coke on the catalyst, and hence during operation, the temperature of the process is gradually raised to compensate for the activity loss caused by the coke deposition. Eventually, however, economics dictate the necessity of reactivating the catalyst. Consequently, in all processing of this type the catalyst must necessarily be periodically regenerated by burning off the coke in the presence of an oxygen-containing gas at controlled conditions. Catalyst reactivation is then completed in a sequence of steps wherein the metal hydrogenation-dehydrogenation components are atomically redispersed.

In the reforming operation, the reactions which predominate between the several reactors differ dependent principally upon the nature of the feed, and the temperature employed within the individual reactors. In the initial reaction zone, or first reactor, which is maintained at a relatively low temperature, it is believed that the primary reaction involves the dehydrogenation of naphthenes to produce aromatics. The isomerization of naphthenes, notably $C_5$ and $C_6$ naphthenes, also occurs to a considerable extent. Most of the other reforming reactions also occur, but only to a lesser, or smaller extent. There is relatively little hydrocracking, and very little olefin or paraffin dehydrocyclization occurs in the first reactor. Within the intermediate reactor zone(s), or reactor(s), the temperature is maintained somewhat higher than in the first, or first reactor of the series, and it is believed that the principal reaction involves the isomerization of naphthenes, normal paraffins and isoparaffins. Some dehydrogenation of naphthenes may, and usually does occur, at least within the first of the intermediate reactors. There is usually some hydrocracking, at least more than in the first reactor of the series, and there is more olefin and paraffin dehydrocyclization. The third reactor of the series, or second intermediate reactor, is generally operated at a somewhat higher temperature than the second reactor of the series. It is believed that the naphthene and paraffin isomerization reactions continue as the primary reaction in this reactor, but there is very little naphthene dehydrogenation. There is a further increase in paraffin dehydrocyclization, and more hydrocracking. In the final reaction zone, or final reactor, which is operated at the highest temperature of the series, it is believed that paraffin dehydrocyclization, particularly the dehydrocyclization of the short chain, notably $C_6$ and $C_7$ paraffins, is the primary reaction. The isomerization reactions continue, and there is more hydrocracking in this reactor than in any one of the other reactors of the series. Unfortunately, dealkylation and hydrocracking reactions occur to some extent throughout all of the reactors of a unit.

In contemporary reforming operations there is a persistent demand for high octane reformate. Despite this however there is also a persistent demand, and need for relatively low octane gasoline for direct fuel use, or as a raw material from which aromatics can be extracted, and there are many locations throughout the world where low severity reforming is conducted to supply these needs.

THE INVENTION

These objects and others are achieved in accordance with the present invention, which embodies a process for improving the octane quality of a naphtha comprising a mixture of paraffins, aromatics and naphthenes by reforming said naphtha feed over a tin modified platinum-iridium catalyst, particularly a tin modified platinum-iridium catalyst as defined hereafter, at reforming conditions sufficient to produce predominantly dehydrogenation and ring isomerization reactions, with minimum dehydrocyclicization, and produce a reformate of RON clear octane ranging from about 80 to about 95, preferably about 85 to about 90, and provide reformate yield credits without significant loss, if any, of catalyst activity.

In its more preferred aspects, the reaction is conducted in a multi-reactor reforming unit constituted of a plurality of serially connected reactors inclusive of one or more lead reactors and tail reactor, the lead reactors of which are provided with a catalyst composition comprised of a platinum-iridium catalyst modified with tin in amount, when reformed at reforming conditions at severity to produce hydrogen and reformate of about 80 RON clear to about 95 RON clear, preferably about 85 RON clear to about 90 RON clear, sufficient to suppress dealkylation in the lead reactors, and the tail reactor with a non-tin modified platinum catalyst, preferably a non-tin modified platinum-iridium catalyst, within which the product of the lead reactors is reformed at reforming conditions sufficient to increase hydrodecyclization, and overall to increase the $C_5+$ liquid naphtha yield vis-a-vis a process operated at similar conditions with catalysts otherwise similar except that the catalyst in the lead reactors do not contain any tin.

The catalyst used in the lead reactors is comprised generally of from about 0.1 percent to about 0.7 percent platinum, preferably from about 0.1 to about 0.5 percent platinum, from about 0.1 percent to about 0.7 percent iridium, preferably from about 0.1 to about 0.5 percent iridium, and from about 0.02 percent to about 0.4 percent tin, preferably from about 0.05 to about 0.3 percent tin, based on the total weight of the catalyst (dry basis), wherein each of the metals is uniformly dispersed throughout a particulate solid support. Suitably, the weight ratio of the (platinum+iridium):tin will range from about 2:1 to about 15:1, preferably from about 4:1 to about 12:1, based on the total weight of platinum, iridium and tin in the catalyst composition. Suitably, the catalyst also contains halogen, preferably chlorine, in concentration ranging from about 0.1 percent to about 3 percent, preferably from about 0.8 to about 1.5 percent, based on the total weight of the catalyst. Preferably also, the catalyst is sulfided, e.g., by contact with a hydrogen sulfide-containing gas, and contains from about 0.01 percent to about 0.2 percent, more preferably from about 0.05 percent to about 0.15 percent sulfur, based on the total weight of the catalyst. The metal components, in the amounts stated, are uniformly dispersed throughout an inorganic oxide support, preferably an alumina support and more preferably a gamma alumina support.

The preferred platinum-iridium catalyst employed in the tail reactor is essentially the same as that employed in the lead reactors except that the catalyst composite does not contain any tin.

A process of this type, as has been suggested, results in the suppression of excessive dealkylation reactions in the lead reactors, this permitting a simultaneous increase in dehydrocyclization reactions in the tail reactor to increase overall the $C_5+$ liquid yields. In addition to increased $C_5+$ liquid yields, the activity of the catalyst employed in the lead reactors is only moderately less than that of catalysts otherwise similar except that they are not modified with tin. Such catalysts are useful in the lead reactors of a unit in which the low octane reformate is either (1) directly processed in a tail reactor at dehydrocyclization conditions, (2) is dearomatized using physical separation, and the dearomatized product then reformed to a higher octane, or (3) all or some portion of the low octane reformate is transferred to a mogas blending pool.

The process of this invention requires the use in the lead reactor, or reactors, of the platinum-iridium catalyst, modified or promoted with the relatively small and infinitesimal amount of tin; or, that portion of the reforming zone wherein the primary, or predominant reaction involves the dehydrogenation of naphthenes to produce aromatics, and the isomerization of naphthenes. This zone, termed the dehydrogenation and ring isomerization zone, or zones, is invariably found in advance of the last reaction zone, i.e., the dehydrocyclization zone, of the series. Of course, where there is only a single reactor, quite obviously the dehydrogenation and ring isomerization reactions will predominate in the catalyst bed, or beds defining the zone, or zones, located at the feed entry side of the reactor upstream of the dehydrocyclization zone. Where reforming is carried out to its full extent and there are multiple reactors, quite obviously the dehydrogenation and ring isomerization reactions will predominate in the catalyst bed, or beds defining a zone(s) located in front of the last reactor of the series. The paraffin dehydrocyclization reaction, in such case, is predominant of the sum-total of the reactions which occur within the catalyst bed, or beds constituting the last reactor of the series dependent upon the temperature and amount of catalyst that is employed in the final reactor vis-a-vis the total catalyst contained in the several reactors, and temperatures maintained in the other reactors of the reforming unit.

In one of its preferred aspects, a non-tin containing promoted platinum catalyst, particularly a non-tin modified platinum-iridium catalyst is employed in the paraffin dehydrocyclization zone. Suitably, where a platinum-iridium catalyst is employed, the weight ratio iridium-platinum will range from about 0.1:1 to about 1:1, preferably from about 0.5:1 to about 1:1, with the absolute concentration of the platinum ranging from about 0.1 percent to about 0.7 percent, preferably from about 0.1 percent to about 0.5 percent, based on the total weight of the catalyst composition. A quite suitable catalyst of this type can also contain iridium in these concentrations, viz. in concentrations ranging from about 0.1 percent to about 0.7 percent, preferably from about 0.1 percent to about 0.5 percent, based on the total weight of the catalyst composition. The catalyst employed in the lead reaction zones, as required in the practice of this invention, is necessarily constituted of composite particles which contain, besides a support material, the hydrogenation/dehydrogenation components, a halide component, and preferably, the catalyst is sulfided. The support material is constituted of a porous, refractory inorganic oxide, particularly alumina. The support can contain, e.g., one or more alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m²/g, preferably from about 100 to about 300 m²/g, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Angstrom units.

The metal hydrogenation-dehydrogenation components can be uniformly dispersed throughout the porous inorganic oxide support by various techniques known to the art such as ion-exchange, coprecipitation with the alumina in the sol or gel form, and the like. For example, the catalyst composite can be formed by adding together suitable reagents such as a salt of tin, and ammonium hydroxide or carbonate, and a salt of aluminum such as aluminum chloride or aluminum sulfate to form aluminum hydroxide. The aluminum hydroxide containing the tin salt can then be heated, dried, formed into pellets or extruded, and then calcined in air or nitrogen up to 1000° F. The other metal components can then be added. Suitably, the metal components can be added to the catalyst by impregnation, typically via an "incipient wetness" technique which requires a minimum of solution so that the total solution is absorbed, initially or after some evaporation.

It is preferred, in forming the tin modified lead reactor catalyst to deposit the tin first, and the additional metals are then added to a previously pilled, pelleted, beaded, extruded, or sieved tincontaining particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique emboding absorption from a dilute or concentrated solution, or solutions, with subsequent filtration or evaporation to effect total uptake of the metallic components which are uniformly dispersed throughout the particulate solids support.

In the step of forming the tin-containing support, a tin salt, e.g., stannous chloride, stannic chloride, stannic tartrate, stannic nitrate, or the like, can be uniformly dispersed throughout a solid support or carrier by the method described in U.S. Pat. No. 4,963,249 which was issued on Oct. 16, 1990 to William C. Baird, Jr. et al, specific reference being made to Column 6, lines 15-23, and to Column 58 through Column 69, inclusively, herewith incorporated and made of reference. In forming the lead reactor catalysts, the step of incorporating tin into the support is omitted, while other metallic components are added to the support by impregnation.

Platinum in absolute amount is usually supported on the carrier within the range of from about 0.1 to about 0.7 percent, preferably from about 0.1 to about 0.5 percent, based on the weight of the catalyst (dry basis). Iridium, in absolute amount, is also usually supported on the carrier in concentration ranging from about 0.1 to about 0.7 percent, preferably from about 0.1 to about 0.5 percent, based on the weight of the catalyst (dry basis). The tin, where added to the support to form the lead reactor catalyst, preferably before addition of the platinum and iridium, is added to the support in concentration ranging from about 0.02 percent to about 0.4 percent, preferably from about 0.05 to about 0.3 percent, based on the total weight of the catalyst (dry basis). The weight ratio of the (platinum+iridium):tin suitably ranges from about 2:1 to about 15:1, preferably from about 4:1 to about 12:1, based on the total weight of the platinum, iridium, and tin in the catalyst composition.

To enhance catalyst performance in reforming operations, it is also required to add a halogen component to the catalysts, fluorine and chlorine being preferred halogen components. The halogen is contained on the catalyst within the range of 0.1 to 3 percent, preferably within the range of about 0.8 to about 1.5 percent, based on the weight of the catalyst. When using chlorine as halogen component, it is added to the catalyst within the range of about 0.2 to 2 percent, preferably within the range of about 1 to 1.5 percent, based on the weight of the catalyst. The introduction of halogen into the catalyst can be carried out by any method at any time. It can be added to the catalyst during catalyst preparation, for example, prior to, following or simultaneously with the incorporation of a metal hydrogenation/dehydrogenation component, or components. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F. and 300° F., in the presence of nitrogen or oxygen, or both, in an air stream or under vacuum. The catalyst is calcined at a temperature between about 400° F. and 850° F., either in the presence of oxygen in an air stream or in the presence of an inert gas such as nitrogen.

Sulfur is a highly preferred component of the catalysts, the sulfur content of the catalyst generally ranging to about 0.2 percent, preferably from about 0.05 percent to about 0.15 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F., and at pressures ranging from about 1 to about 40 atmospheres for the time necessary to achieve breakthrough, or the desired sulfur level.

The feed or charge stock can be a virgin naphtha, cracked naphtha, a naphtha from a coal liquefaction process, a Fischer-Tropsch naphtha, or the like. Typical feeds are those hydrocarbons containing from about 5 to about 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 15 to about 80 vol. % paraffins, both normal and branched, which fall in the range of about $C_5$ to $C_{12}$, from about 10 to 80 vol. % of naphthenes falling within the range of from about $C_6$ to $C_{12}$, and from 5 through 20 vol. % of the desirable aromatics falling within the range of from about $C_6$ to $C_{12}$.

The reforming runs are initiated by adjusting the hydrogen and feed rates, and the temperature (Equivalent Isothermal Temperature) and pressure to operating conditions. The run is continued at optimum reforming conditions by adjustment of the major process variables, within the ranges described below:

| Major Operating Variables | Typical Process Conditions | Preferred Process Conditions |
|---|---|---|
| LEAD REACTOR CONDITIONS | | |
| Pressure, psig | 100–700 | 150–500 |
| Reactor Temp., °F. | 700–1000 | 800–950 |
| Recycle Gas Rate, SCF/B | 2,000–10,000 | 2,000–6,000 |
| Feed Rate, W/Hr/W | 1–20 | 5–15 |
| TAIL REACTOR CONDITIONS | | |
| Pressure, psig | 100–700 | 150–500 |
| Reactor Temp., °F. | 800–1000 | 850–975 |
| Recycle Gas Rate, SCF/B | 2,000–10,000 | 2,000–6,000 |
| Feed Rate, W/Hr/W | 1–10 | 2–8 |

The major operating variables, in accordance with the practice of this invention are selected to provide a combination of values which will produce in the dehydrogenation and ring isomerization zone, or zones, which contain a tin modified platinum-iridium catalyst, an RON clear octane number ranging from about 80 to about 95, preferably from about 85 to about 90. In other words, a combination of values are selected which provides an RON clear octane number reformate product from the lead reactor, or reactors, of a series, containing a tin modified platinum-iridium catalyst, ranging from about 80 to about 95, preferably from about 85 to about 90. This low octane reformate, in a preferred operation, is then processed in the dehydrocyclization zone, or tail reactor of the series, over a non-tin-containing platinum, or preferably a non-tin-containing platinum-iridium catalyst at generally higher severity conditions. Pursuant to operations at these conditions, the lead reactor, or reactors will produce at the low severity conditions greater yields of $C_5+$ reformate, generally up to about 2 vol. percent, or greater, than processes otherwise similar except that they do not contain a tin modified platinum-iridium catalyst; and this selectivity advantage will remain, or persist, even after the reformate is processed at higher severities in the tail reactor over a non-tincontaining platinum, or platinum-iridium catalyst. The activity of the catalyst employed in the lead reactor, or reactors, of the series, despite the higher selectivity, is only slightly less than that of a catalyst otherwise similar except that it does not contain tin.

The selection of the combination of major operating variables required to produce a target octane is per se well within the skill of the art. For example, a selection made between temperature and space velocity can be used to produce an RON clear octane product in the lead reactor, or reactors, ranging between 80 and 95, or preferably 85 to 90, as desired. Total pressure, and the hydrogen:oil ratio, or combinations of these major operating values with other operating values can also be employed to produce a target octane number for a reformate product of a lead reactor, or reactors.

The inventive process will be more fully understood by reference to the following examples, illustrating its more salient features. In the examples which follow all parts are given in terms of weight units, pressures in terms of pounds per square inch gauge, and temperatures in Fahrenheit degrees except as otherwise expressed.

EXAMPLES

Inspections on a full range Arab Light naphtha feed employed in making these tests are given below:

| Property | Arab Light Naphtha |
|---|---|
| Gravity at 60° | |
| API° | 59.4 |
| Specific | 0.7412 |
| Octane, RON Clear | 38 |
| Molecular Weight | 111.3 |
| Sulfur, wppm | 0.3 |
| Distillation D-86, °F. | |
| IBP | 193.5 |
| 5% | 216.5 |
| 10% | 221.0 |
| 50% | 257.0 |
| 90% | 309.0 |
| 95% | 320.5 |
| FBP | 340.0 |
| Composition, Wt. % | |
| Total Paraffins | 65.1 |
| Total Naphthenes | 19.3 |
| Total Aromatics | 15.6 |

In a series of runs, each of a number of selected catalysts were individually charged to a single reactor, the reactor filled to capacity with the catalyst, and runs made by passage of the naphtha over the catalysts at conditions simulating reforming at (1) essentially dehydrogenation conditions (R-1), and (2) essentially dehydrogenation and ring isomerization conditions (R-1+R-2), respectively. The catalysts employed in making these runs were: Catalyst A (0.3 wt. % Pt/0.3 wt. % Ir); and Catalysts $B_1$ through $B_5$, each containing varying amounts of Pt, Ir and Sn, respectively. The metal components, in the production of all of Catalysts A and B were uniformly distributed throughout a particulate alumina support.

The catalysts, i.e., Catalysts A and B, respectively, were evaluated at the following conditions:

| | R-1 | (R-1 + R-2) |
|---|---|---|
| Space Velocity, W/Hr/W | 10 | 6.5 |
| $H_2$ (Once-Through) KSCF/B | 2 | 2 |
| Temperature, °F. | 905 | 905 |
| Pressure, psig | 275 | 275 |
| RON, clear | 80 | 88.5 |

The following is a tabulation of the $C_5+$ liquid yield, given in Liquid-Volume %, for runs made with each of the catalysts at simulated R-1 and (R-1+R-2) conditions, respectively.

TABLE

| | $C_5+$ Liquid Yield, LV % | |
|---|---|---|
| | R-1 | (R-1 + R-2) |
| Catalyst A (0.3 wt. % Pt/0.3 wt. % Ir) | 83.9 | 80.2 |
| Catalyst $B_1$ (0.3 wt. % Pt/0.3 wt. % Ir/ 0.1 wt. % Sn) | 84.1 | 82.3 |
| Catalyst $B_2$ (0.3 wt. % Pt/0.1 wt. % Ir/ 0.1 wt. % Sn) | — | 81.9 |
| Catalyst $B_3$ (0.3 wt. % Pt/0.1 wt. % Ir*/ 0.1 wt. % Sn) | — | 80.8 |
| Catalyst $B_4$ | — | 82.2 |

TABLE-continued

|  | $C_5^+$ Liquid Yield, LV % | |
|---|---|---|
|  | R-1 | (R-1 + R-2) |
| (0.1 wt. % Pt/0.1 wt. % Ir/ 0.1 wt. % Sn) Catalyst B$_5$ | — | 82.7 |
| (0.1 wt. % Pt/0.1 wt. % Ir*/ 0.1 wt. % Sn) |  |  |

*agglomerated iridium

The family of runs with the platinum-iridium-tin catalysts show that reforming the naphtha at low severity RON clear octane numbers above 80, notably at between 85 and 90, reformate yield credits approximate 2 LV % without any loss of the high activity credits which are normal for platinum-iridium catalysts. Excessive dealkylation is suppressed in these reactions by the presence of the tin, and by the combination of the low platinum and iridium contents and the tin. The greatest difference in $C_5+$ liquid yields occurs at (R-1+R-2) conditions as contrasted with runs made at R-1 conditions.

In comparing relative activity value vis-a-vis time-on-oil, between about 10 hrs. and 100 hrs., Catalyst B$_5$ is shown to have the highest activity, as well as the greatest $C_5+$ liquid selectivity, in low-severity reforming at (R-1+R-2) conditions throughout the period of operations vis-a-vis any other catalyst.

The following experiments demonstrate the critical differences between U.S. Pat. No. 3,718,578 (Buss et al.) and the instant application.

EXAMPLE 1

A catalyst of this invention was prepared by impregnating Pt and Ir onto a tin containing alumina (0.3 wt. % Sn) prepared by the addition of a tin chloride to the alumina mull mix prior to extrusion. The catalyst was dried and shown by analysis to contain 0.6 wt. % each Pt and Ir and 0.3 wt. % Sn. The extrudates were examined by electron probe microscopy to determine the distribution of the three metals through the extrudate particles. This is a common analytical technique used to assess whether the method of catalyst synthesis has achieved a uniform distribution of all metals of a polymetallic catalyst, or whether one, or more metals, is maldistributed and localized either in the extrudate core or in the outermost extremities, or edges. The latter is the most frequently encountered type of maldistribution and is generally conceded to adversely effect catalyst performance as regions of the particle are essentially free of the maldistributed components(s). Examination of the catalyst of this invention prepared as described above showed that the Pt, Ir, and Sn were properly distributed.

EXAMPLE 2

The catalyst of U.S. Pat. No. 3,718,578 was prepared by following the general procedures disclosed in Col. 3 and 4 of that patent. In this example, Pt, Ir, and Sn were simultaneously impregnated onto alumina extrudates to give a composition of 0.3 Pt–0.3Sn–0.05Ir. Examination of this catalyst showed acceptable distribution of Pt and Ir. All of the Sn was shown to be present in the outer edges of the catalyst and was essentially absent from the interior.

EXAMPLE 3

In this case a procedure of U.S. Pat. No. 3,718,578 was followed wherein Pt ind Ir were impregnated onto the alumina, and after a suitable interval Sn was impregnated. The composition of the catalyst was identical to that of Example 2. As in Example 2, Pt and Ir were properly distributed while the Sn occupied exclusively the exterior region of the particle.

EXAMPLE 4

A 0.3Pt—0.3Sn—0.05Ir catalyst was prepared in this example by first impregnating the alumina with Sn, and after a suitable interval Pt and Ir were impregnated. This catalyst also exhibited proper distribution of Pt and Ir, but Sn was severely maldistributed to the outermost edges.

EXAMPLE 5

A 0.3Pt—0.3Sn—0.05Ir catalyst was prepared by impregnating Pt and Ir onto the same 0.3 wt. % Sn containing alumina used in Example 1. Examination of this catalyst showed all three metals to be well distributed. Examples 1 and 5 showed that a catalyst properly distributed in all three metals results only when Pt and Ir are impregnated onto a sn containing alumina prepared by adding a Sn compound to the alumina mull mix prior to extrusion. The procedures described in the above referenced patent invariably yield catalysts with severe Sn maldistribution.

The catalysts of Examples 1-5 were calcined in flowing air, reduced in flowing hydrogen, and sulfided according to the general procedures outlined in U.S. Pat. No. 3,718,578. The catalysts were then evaluated in heptane reforming; the conditions being selected so that the catalysts could be compared at nominally the same level of conversion so that intrinsic differences in activity and selectivity would be apparent. The results appear in the following table.

| HEPTANE REFORMING WITH PT—IR—SN CATALYSTS Heptane, 500° C., 100 psig. 10-20 W/H/W, H$_2$/Oil = 6 | | | | | |
|---|---|---|---|---|---|
|  | Example | | | | |
|  | 1 | 2 | 3 | 4 | 5 |
| Catalyst | 0.6Pt—0.6Ir—0.3Sn | ... 0.3Pt—0.3Sn—0.05Ir ... | | | |
| Yield, Wt. % on Feed | | | | | |
| C$_1$ | 1.6 | 1.4 | 1.4 | 1.2 | 1.0 |
| i-C$_4$ | 2.7 | 3.0 | 2.9 | 3.1 | 4.1 |
| n-C$_4$ | 5.7 | 4.9 | 4.9 | 4.2 | 4.0 |
| C$_5+$ | 80.2 | 82.2 | 82.2 | 83.7 | 82.1 |
| Toluene | 28.0 | 28.5 | 29.3 | 27.5 | 25.1 |
| Conversion | 64.8 | 62.8 | 63.7 | 59.6 | 58.3 |
| Activity | 5.7 | 2.9 | 3.0 | 2.8 | 2.6 |
| Toluene Selectivity | 43.2 | 45.3 | 46.0 | 46.0 | 43.1 |

This data demonstrates the unexpected result that activity and selectivity of the catalyst may be enhanced if Pt and Ir are impregnated onto a Sn containing alumina prepared by adding a Sn compound to the alumina mull mix prior to extrusion. This ensures that the Sn is substantially homogeneously distributed throughout the support. The procedures described in Buss et al. invariably yield catalysts with severe Sn maldistribution.

The data in the declaration show the catalyst of this invention to be twice as active as the catalysts of Examples 2-5 at the same conversion level. Furthermore, this higher activity is not purchased at the expense of selectivity as the C5+ and toluene yields are near parity. Methane and n-butane yields for the catalysts of Examples 2-4 exceed those of the catalyst of Example 5 as a consequence of the Sn maldistribution, which fails to moderate cracking as effectively as the properly distributed catalyst of Example 5. This quality is reflected in Example 1 of this invention where the methane and butane yields remain controlled despite a substantial increase in the Pt and Ir levels at constant Sn.

These results show that the catalyst of this invention, prepared by the impregnation of Pt and Ir onto a Sn containing alumina, is preferred on the basis of superior activity and the absence of metals maldistribution.

Buss et al. does not teach the mixing of the Sn with the mull mix prior to extrusion before the application of Pt and Ir to the support. Electron microscopy of the catalyst of the instant invention shows uniform distribution of all metals while electron microscopy of the catalysts prepared according to Buss et al. showed maldistribution of one or more of the metals.

It is apparent that various modifications and changes can be made without departing the spirit and scope of the invention.

What is claimed is:

1. A process for improving the octane quality of a naphtha comprising a mixture of paraffins, aromatics and naphthenes, which comprises reforming said naphtha feed over a tin modified platinum-iridium catalyst at reforming conditions sufficient to produce predominantly dehydrogenation and ring isomerization reactions, with minimum paraffin dehydrocyclization, and produce a reformate of RON clear octane ranging from about 80 to about 95, said catalyst comprising from about 0.1 percent to about 0.7 percent platinum, from about 0.1 percent to about 0.7 percent iridium, and from about 0.02 percent to about 0.4 percent tin, wherein each of said metals is composited with and uniformly dispersed throughout an inorganic oxide support.

2. The process of claim 1 wherein the catalyst composite contains from about 0.1 percent to about 0.5 percent platinum, from about 0.1 percent to about 0.5 percent iridium, and from about 0.05 to about 0.3 percent tin.

3. The process of claim 1 wherein the catalyst composite contains from about 0.1 percent to about 3 percent halogen, and containing up to about 0.05-0.15 percent sulfur.

4. The process of claim 1 wherein the inorganic oxide support component of the catalyst is alumina.

5. In a process of improving the octane quality of a naphtha comprised of a mixture of paraffins, aromatics and naphthenes in a reforming unit comprised of a plurality of serially connected reactors inclusive of one or more lead reactors and a tail reactor, each of which contains a platinum catalyst, the naphtha flowing in sequence from one reactor of the series to another and contacting the catalyst in the presence of hydrogen, the improvement comprising, providing the lead reactor, or reactors, of the series with a catalyst comprised of from about 0.1 percent to about 0.7 percent platinum, from about 0.1 percent to about 0.7 percent iridium, and from about 0.02 percent to about 0.4 percent tin, based on the total weight of the catalyst, wherein each of said metals is composited with and uniformly dispersed throughout an inorganic oxide support and reforming said naphtha feed over said catalyst at reforming conditions in said one or more lead reactors sufficient to produce predominantly dehydrogenation and ring isomerization reactions, with minimum paraffin dehydrocyclization, and produce a reformate of RON clear ranging from about 80 to about 95.

6. The process of claim 6 wherein the catalyst in the lead reactor, or reactors, contains from about 0.1 percent to about 0.5 percent platinum, from about 0.1 percent to about 0.5 percent iridium, and from about 0.05 to about 0.3 percent tin.

7. The process of claim 6 wherein the catalyst in the tail reactor contains from about 0.1 to about 0.7 percent platinum, and from about 0.1 percent to about 0.7 percent iridium.

8. The process of claim 8 wherein the catalyst in the tail reactor contains from about 0.1 percent to about 0.5 percent platinum, and from about 0.1 percent to about 0.5 percent iridium.

9. The process of claim 6 wherein the catalyst contains from about 0.1 percent to about 3 percent halogen, and containing up to about 0.05-0.15 percent.

10. The process of claim 6 wherein the reforming conditions employed in the lead reactor, or reactors, of the series are defined as follows:

| | |
|---|---|
| Pressure, psig | about 150 to 500 |
| Reactor Temperature, °F. | about 800 to 950 |
| Gas Rate, SCF/B | about 2,000 to 6,000 |
| Feed Rate, W/Hr/W | about 5 to 15. |

11. The process of claim 6 wherein the reforming conditions employed in the tail reactor of the series are defined as follows:

| | |
|---|---|
| Pressure, psig | about 100 to 700 |
| Reactor Temperature, °F. | about 800 to 1000 |
| Gas Rate, SCF/B | about 2,000 to 10,000 |
| Feed Rate, W/Hr/W | about 1 to 10. |

12. The process of claim 6 wherein the reforming conditions employed in the tail reactor of the series are defined as follows:

| | |
|---|---|
| Pressure, psig | about 150 to 500 |
| Reactor Temperature, °F. | about 850 to 975 |
| Gas Rate, SCF/B | about 2,000 to 6,000 |
| Feed Rate, W/Hr/W | about 2 to 8. |

* * * * *